United States Patent
Church et al.

(10) Patent No.: US 11,425,559 B1
(45) Date of Patent: Aug. 23, 2022

(54) DATA TRANSMISSION NETWORK DEVICE

(71) Applicant: Know 2Solutions, LLC, Lutz, FL (US)

(72) Inventors: Claude Church, Land O Lakes, FL (US); Patrick L. Geddes, Northport, AL (US)

( * ) Notice: Subject to any disclaimer, the term of this patent is extended or adjusted under 35 U.S.C. 154(b) by 438 days.

(21) Appl. No.: 16/413,175

(22) Filed: May 15, 2019

Related U.S. Application Data

(60) Provisional application No. 62/671,791, filed on May 15, 2018.

(51) Int. Cl.
| | | |
|---|---|---|
| *H04W 12/037* | (2021.01) | |
| *G06F 9/455* | (2018.01) | |
| *H04W 12/041* | (2021.01) | |
| *H04W 12/088* | (2021.01) | |

(52) U.S. Cl.
CPC ...... *H04W 12/037* (2021.01); *G06F 9/45558* (2013.01); *H04W 12/041* (2021.01); *H04W 12/088* (2021.01); *G06F 2009/45595* (2013.01)

(58) Field of Classification Search
CPC ............. H04W 12/037; H04W 12/041; H04W 12/088; G06F 9/45558; G06F 2009/45595
See application file for complete search history.

(56) References Cited

U.S. PATENT DOCUMENTS

| | | | | |
|---|---|---|---|---|
| 7,483,032 B1* | 1/2009 | Yeoh | ...................... | G09G 5/363 345/568 |
| 8,155,036 B1* | 4/2012 | Brenner | .................. | H04L 12/66 370/293 |
| 9,767,317 B1* | 9/2017 | Chakrovorthy | ......... | G06F 21/71 |
| 9,792,447 B2* | 10/2017 | Thota | ..................... | G06F 21/568 |
| 10,075,418 B1* | 9/2018 | Stancik | ............... | H04L 63/0428 |
| 2003/0214904 A1* | 11/2003 | Bois | ..................... | H04J 13/0003 370/218 |
| 2005/0036622 A1* | 2/2005 | Hay | ...................... | H04L 63/0428 380/270 |
| 2006/0253396 A1* | 11/2006 | Ohkawa | .................. | H04L 63/06 705/50 |
| 2009/0296941 A1* | 12/2009 | Devanand | ............. | H04L 9/0825 380/281 |
| 2012/0182938 A1* | 7/2012 | Mujtaba | ................ | H04W 88/06 370/328 |

(Continued)

*Primary Examiner* — Lynn D Feild
*Assistant Examiner* — Abdullah Almamun
(74) *Attorney, Agent, or Firm* — Bradley Arant Boult Cummings LLP

(57) ABSTRACT

Embodiments of a data transmission network device and methods of operating the same are disclosed. In one embodiment, the data transmission network device includes an encryption module and an RF transceiver. The encryption module is configured to receive data and encrypt the data so as to generate first encrypted data. The encryption module then encrypts the first encrypted data so as to generate second encrypted data. The RF transceiver is configured to generate an RF signal such that the second encrypted data is modulated onto the RF signal. By providing the double encryption in a single device, the data transmission network device has greater spectral efficiency and is a much more cost-effective solution than what is currently provided in the market. Furthermore, the encryption module can be disabled so that unsecure data can also be transmitted via the data transmission network device.

13 Claims, 3 Drawing Sheets

(56) References Cited

U.S. PATENT DOCUMENTS

| | | | |
|---|---|---|---|
| 2013/0198530 A1* | 8/2013 | Wang | G06F 9/5027 |
| | | | 713/190 |
| 2013/0286602 A1* | 10/2013 | Chang | H05K 7/026 |
| | | | 361/736 |
| 2015/0372816 A1* | 12/2015 | Lee | G06F 13/4282 |
| | | | 713/189 |
| 2016/0029211 A1* | 1/2016 | Furuta | H04L 9/088 |
| | | | 380/270 |
| 2016/0294544 A1* | 10/2016 | Jang | H04L 7/0037 |
| 2016/0344898 A1* | 11/2016 | Mitsuhashi | H04L 63/083 |
| 2016/0365976 A1* | 12/2016 | Yamaguchi | H04L 9/0894 |
| 2017/0111328 A1* | 4/2017 | Leon | H04L 9/30 |
| 2017/0150348 A1* | 5/2017 | Kowalevicz | H04L 9/0816 |
| 2018/0191491 A1* | 7/2018 | Chhabra | G06F 12/08 |
| 2019/0045634 A1* | 2/2019 | Hill | H05K 3/36 |

\* cited by examiner

DATA TRANSMISSION NETWORK DEVICE

RELATED APPLICATIONS

This application claims the benefit of provisional patent application Ser. No. 62/671,791, filed May 15, 2018, the disclosure of which is hereby incorporated herein by reference in its entirety.

FIELD OF THE DISCLOSURE

This disclosure relates generally to computer networking equipment and methods of operating the same.

BACKGROUND

Doubly encrypting data is often needed in order to comply with the security standards from government agencies, such as the National Security Agency (NSA). Unfortunately, current radio frequency (RF) computer networking equipment is not capable of providing doubly encrypted data in an efficient and cost-effective manner. This is because currently, a combination of products such as modems, switches, and routers are needed in order to build secure network tunnels between end points. Secure network tunnels built in this manner also require encryption devices at both ends of the enclave. Furthermore, unsecure network traffic cannot be transmitted through these secure tunnels due to the encryption devices at both ends. Thus, separate unsecure network tunnels are required to transmit unsecure traffic. As a result, current RF networking equipment can take up to approximately 30% of the available bandwidth for secure transmission overhead, thereby leaving only 70% of the bandwidth for the encrypted data payload.

What is needed are more efficient systems for providing secure RF computer networking links.

SUMMARY

Embodiments of a data transmission network device and methods of operating the same are disclosed. In one embodiment, the data transmission network device includes an encryption module and an RF transceiver. The encryption module is configured to receive data and encrypt the data so as to generate first encrypted data. The encryption module then encrypts the first encrypted data so as to generate second encrypted data. The RF transceiver is configured to generate an RF signal such that the second encrypted data is modulated onto the RF signal. By providing the double encryption in a single device, the data transmission network device has greater spectral efficiency and is a much more cost-effective solution than what is currently provided in the market. Furthermore, the encryption module's encryption functionality can be disabled so that unsecure data can also be transmitted via the data transmission network device.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWINGS

The accompanying drawings incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the disclosure and illustrate the best mode of practicing the disclosure. Upon reading the following description in light of the accompanying drawings, those skilled in the art will understand the concepts of the disclosure and will recognize applications of these concepts not particularly addressed herein. It should be understood that these concepts and applications fall within the scope of the disclosure and the accompanying claims.

Figure 1:
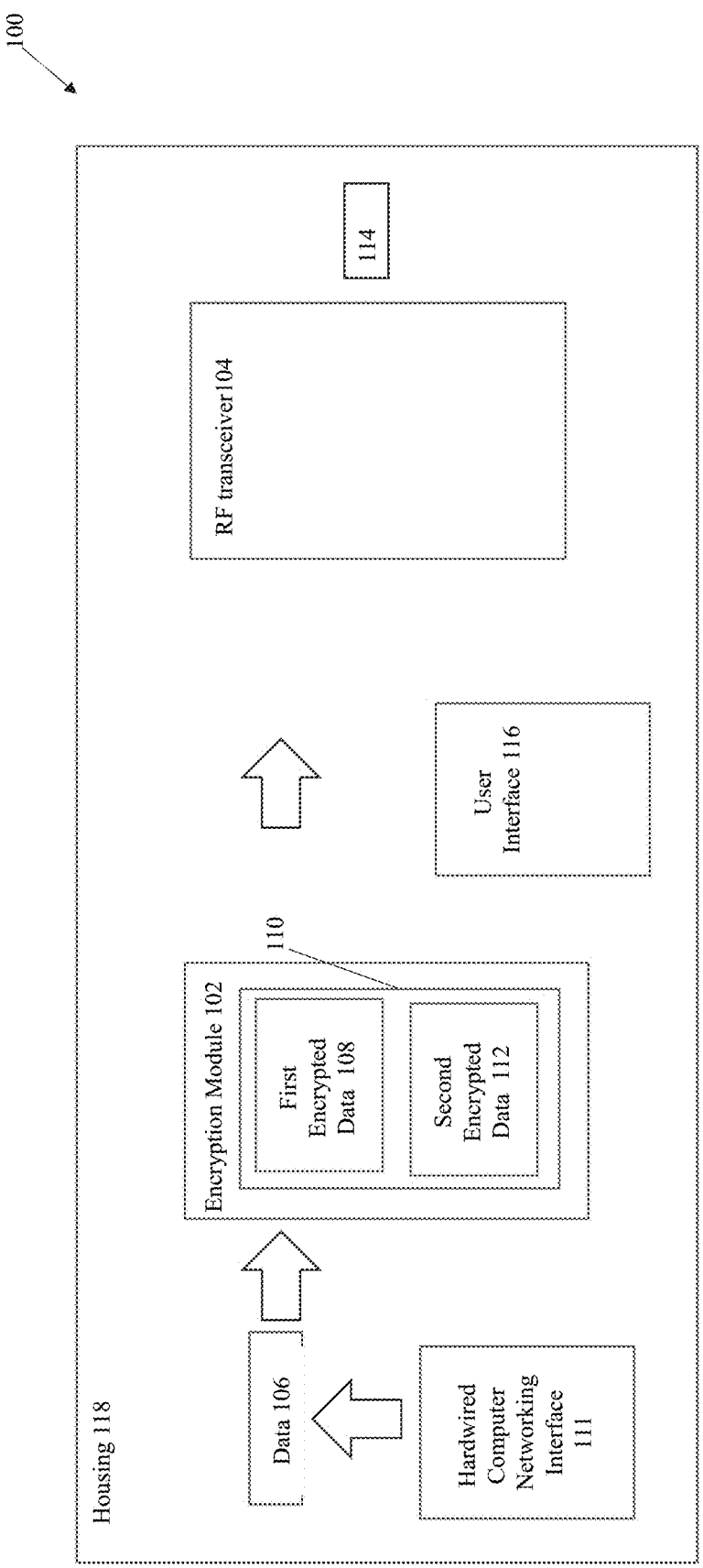
FIG. 1 illustrates an exemplary data transmission network device.

FIG. 1 illustrates an exemplary data transmission network device 100 in accordance with this disclosure. The data transmission network device 100 includes an encryption module 102 and a radio frequency (RF) transceiver 104. The encryption module 102 is configured to receive data 106, which is the data to be included as a payload and/or as metadata in an RE communication link. This data 106 may originate from any data source where data from the data source needs to be transmitted via hard wire connections to the data transmission network device 100. The encryption module 102 is configured to allow for encrypted RF communications between different network nodes. In other words, the encryption module 102 is responsible for setting up the end-to-end encryption needed to secure the data 106 when the data 106 is being transmitted from one network node to another network node or to multiple other network nodes.

The encryption module 102 is configured to encrypt the data 106 so as to generate first encrypted data 108 from the data 106. The encryption module 102 may include a memory buffer 110 for storing the first encrypted data 108 after the first encrypted data 108 has been generated from the data 106. The encryption module 102 may receive the original data 106 from some data source internal or external to the data transmission network device 100. In some embodiments, the encryption module 102 is configured to use standard AES 256 encryption algorithms to generate the first encrypted data 108 from the data 106. The encryption module 102 may also use Layer 2 encrypted tunneling during the encryption of the data 106. Hardwired computer networking interface 111 may be provided so that the data transmission network device 100 receives the data 106 from external devices.

Additionally, the encryption module 102 is configured to encrypt the first encrypted data 108 so as to generate second encrypted data 112. The encryption module 102 may also use Layer 2 encrypted tunneling during the encryption of the first encrypted data 106 and the encryption may be provided in accordance with AES 256 encryption algorithms. Since the data 106 is encrypted into the first encrypted data 108 and the first encrypted data 108 is encrypted into the second encrypted data 112, the encryption module 102 is configured to provide double data encryption to the data 106. This permits for the data transmission network device 100 to provide sufficient encryption so as to satisfy current NSA standards for certain customers. The encryption module 102 may encrypt the data 106 to generate the first encrypted data 108 and encrypt the first encrypted data 108 so as to generate the second encrypted data 112 using one or more pre-placed public keys (PPPKs). Thus, a different PPPK may be used by the encryption module 102 to generate the first encrypted data 108 from the data 106 and to generate the second encrypted data 112 from the first encrypted data 108. These and other encryption techniques would be apparent to one of ordinary skill in the art in light of this disclosure.

The encryption module 102 interfaces with the RF transceiver 104, which in turn provides a RF data link. More specifically, the RF transceiver 104 is configured to generate an RF signal 114, which is emitted wirelessly and electromagnetically by the RF transceiver 104 via antenna(s) or the like. The RF transceiver 104 is configured to modulate the second encrypted data 112 onto the RF signal 114. Thus, the RF signal 114 may have some physical characteristic that is adjusted in accordance with the second encrypted data 112 so that the second encrypted data 112 is modulated onto the RF carrier. Any type of modulation scheme may be utilized to modulate the second encrypted data 112 onto the RF signal 114.

Typical wireless modulation schemes that may be utilized by the RF transceiver 104 include multiple-access technologies capable of supporting communication with multiple users by way of efficiently modulating data onto an RF spectrum medium. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems. These and other modulation schemes would be apparent to one of ordinary skill in the art in light of this disclosure.

In some embodiments, the RF transceiver 104 may encrypt the RF signal 114. Thus, unlike the encryption module 102, which encrypts the data 106 itself. The RF transceiver 104 may be configured to encrypt the RF signal 114 with the modulated and doubly encrypted second encrypted data 112. Some exemplary encryption techniques that may be utilized by the RF transceiver 104 to encrypt the RF signal 114 include frequency hopping, dynamic symbol rate adjustments, and power to signal ratios that mask the RE signal 114 into the noise floor. The data transmission network device 100 allows for the encrypted traffic to terminate at any or all of the following; a central hub facility, a Point of Presence (PoP) facility, a specific far end customer premise facility, or even a different satellite remote unit.

In some embodiments, the RF transceiver 104 is operable to modulate the second encrypted data 112 onto the RF signal 114 in accordance with multiple selectable modulation schemes. These modulation schemes may be selectable through a user interface 116 provided by the data transmission network device 100 and may include the modulation schemes listed above.

Furthermore, the encryption function of encryption module 102 may be disabled such that the data 106 is modulated onto the RF signal 114 without encryption. In other words, the data 106 can bypass the encryption module 102 and simply be modulated onto the RF signal 114 without any type of data encryption from the encryption module 102. The high capacity, ruggedized user interface 116 allows for a direct interface to the encryption module 102 (as a secure enclave), or alternately a direct interface to the RF transceiver 104 (as an unsecure enclave). The data transmission network device 100 thus supports both unencrypted traffic and encrypted traffic where the data transmission network device 100 is configured to separate and route secured and unsecured traffic to different distant end entities and enclaves.

Note that the encryption module 102, the RF transceiver 104, and the user interface 116 are provided in a housing 118. Thus, the data transmission network device 100 is all provided as one integrated unit rather than being pieced together in separate network devices. In fact, in previous solutions, transmission of the encrypted and unencrypted traffic would have required separate and independent sets of devices. It should be noted that current embodiments of the data transmission network device 100 are capable of doubly encrypting data while providing a highly efficient RF carrier roll-off of 5%.

Figure 2:
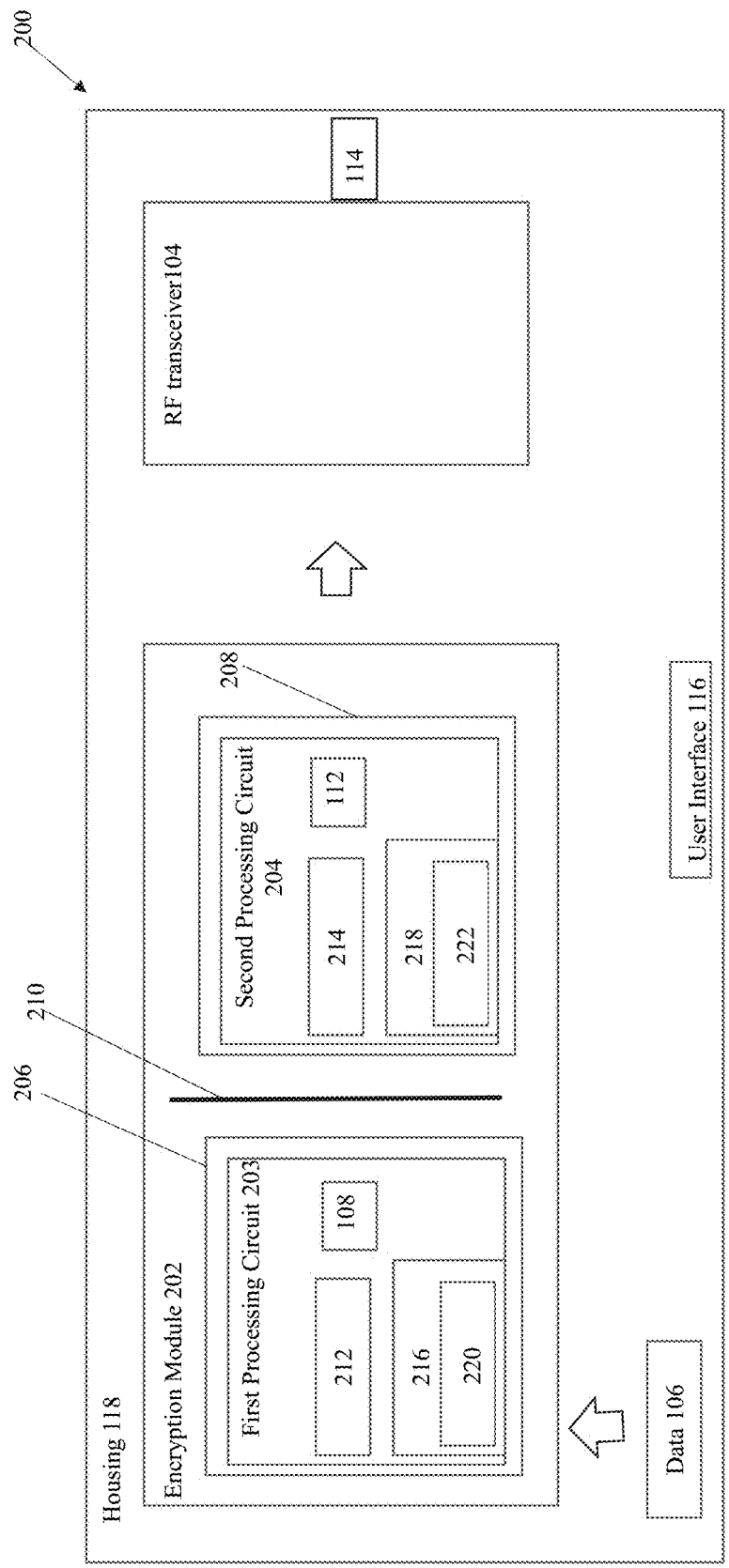
FIG. 2 illustrates one embodiment of the data transmission network device shown in FIG. 1.

FIG. 2 illustrates an exemplary data transmission network device 200, which is one embodiment of the data transmission network device 100 shown in FIG. 1. The data transmission network device 200 includes an exemplary encryption module 202 and the RF transceiver 104 (described above). The encryption module 202 is one embodiment of the encryption module 102 described above. In this embodiment, the encryption module 202 includes a first processing circuit 203 and a second processing circuit 204. The first processing circuit 203 is integrated into a first printed circuit board 206 while the second processing circuit 204 is integrated into a second printed circuit board 208. A bus 210 operably interfaces the first printed circuit board 206 and the second printed circuit board 208.

The first processing circuit 203 on the first printed circuit board 206 includes one or more processors 212 while the second processing circuit 204 on the second printed circuit board 208 includes one or more processors 214. Thus, the processors 214 in the second processing circuit 204 are separate from the processors 212 in the first processing circuit 203. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure.

Furthermore, the first processing circuit 203 on the first printed circuit board 206 includes one or more memories 216 while the second processing circuit 204 on the second printed circuit board 208 includes one or more memories 218. The memories 218 in the second processing circuit 204 are separate from the memories 216 in the first processing circuit 203. By way of example, and not limitation, computer-readable media that may be provided in the memories can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

The memories 216 in the first processing circuit 203 on the first printed circuit board 206 store computer executable instructions 220 while the memories 218 in the second processing circuit 204 on the second printed circuit board 208 store computer executable instructions 222. The computer executable instructions 222 in the second processing circuit 204 are separate from the computer executable instructions 220 in the first processing circuit 203. Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Since the first processing circuit 203 and the second processing circuit 204 include separate processors 212, 214, memories 216, 218, and computer executable instructions 220, 222, the first processing circuit 203 and the second processing circuit 204 operate as separate and independent machines. This is an important separation as it provides an important security feature needed for double encryption. More specifically, when executing the computer executable instructions 220 stored in the memories 216, the processors 212 in the first processing circuit 203 are configured to receive the data 106 and encrypt the data 106 so as to generate the first encrypted data 108. Furthermore, when executing the second computer executable instructions 222 stored in the memories 218, the processors 214 in the second processing circuit 204 are configured to receive the first encrypted data 108 from the first processing circuit 203 and encrypt the first encrypted data 108 so as to generate the second encrypted data 112. Data encryption may be provided as described above in FIG. 1 with respect to the encryption module 102.

The second processing circuit 204 may then provide the second encrypted data 112 to the RF transceiver 104, which modulates the second encrypted data 112 onto the RF signal 114 as described above with respect to FIG. 1. The user interface 116 may be provided so as to select and deselect the encryption module 202 and to select a modulation scheme for the RF transceiver 104, also as described above with respect to FIG. 1. Both the encryption module 202 and the RF transceiver 104 are provided in the housing 118.

Figure 3:
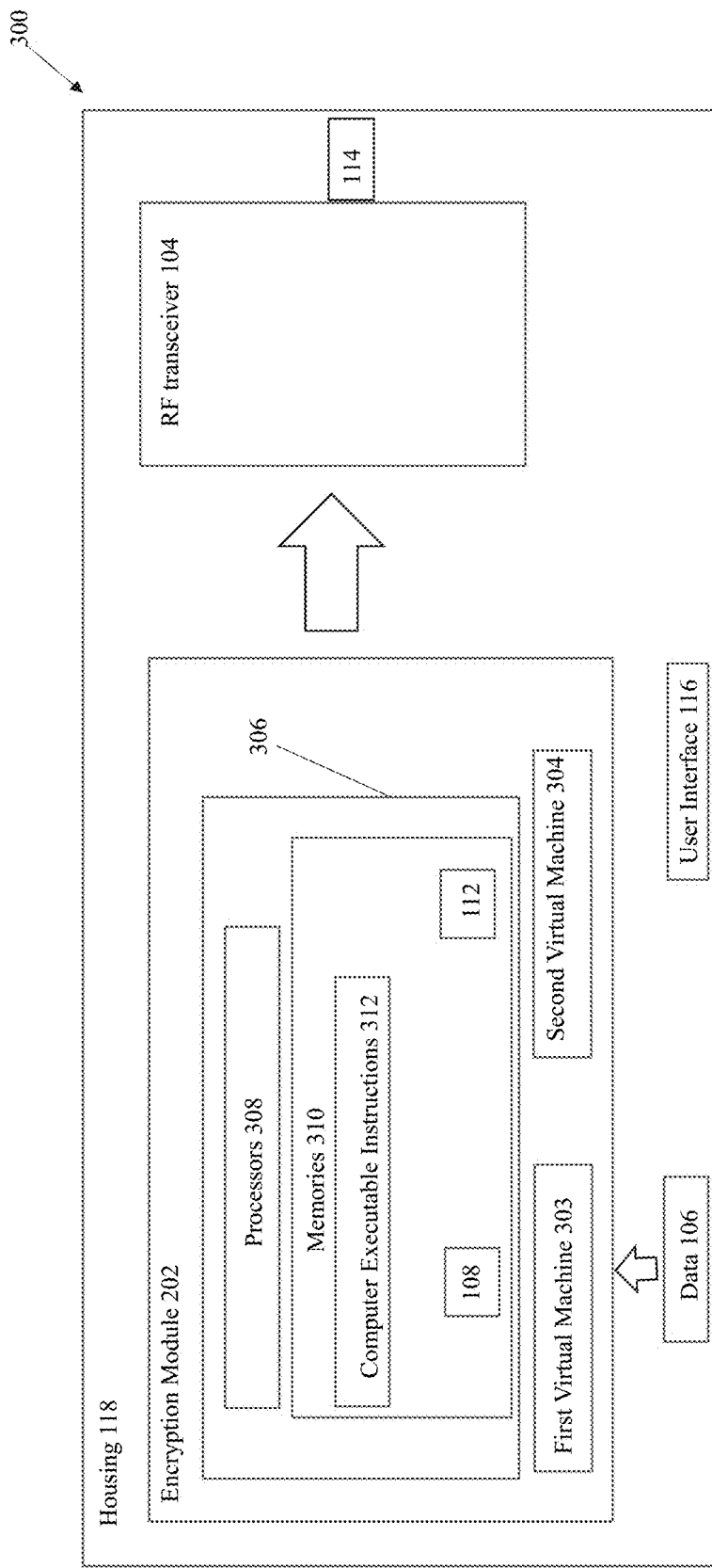
FIG. 3 illustrates still another embodiment of the data transmission network device shown in FIG. 1.

FIG. 3 illustrates an exemplary data transmission network device 300, which is one embodiment of the data transmission network device 100 shown in FIG. 1. The data transmission network device 300 includes an exemplary encryption module 302 and the RF transceiver 104 (described above). The encryption module 302 is one embodiment of the encryption module 102 described above. In this embodiment, the encryption module 302 is configured to implement a first virtual machine 303 and a second virtual machine 304.

More specifically, the encryption module 302 is all provided on a single printed circuit board 306 that includes one or more processors 308 and one or more memories 310. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. By way of example, and not limitation, computer-readable media that may be provided in the memories can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

The memories 310 store computer executable instructions 312. Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

When the processors 308 execute the computer executable instructions 312 stored in the memories 310, the processors 308 are configured to implement the first virtual machine 303 and the second virtual machine 304. Although the first virtual machine 303 and the second virtual machine 304 are implemented using the same physical processors 308, the same physical memories 310, and the same computer executable instructions 312, the first virtual machine 303 and the second virtual machine 304 operate as separate and independent virtual (software) machines. This is an important separation as it provides an important security feature needed for double encryption. More specifically, when executing the computer executable instructions 312, the first virtual machine 303 is configured to receive the data 106 and encrypt the data 106 so as to generate the first encrypted data 108. Furthermore, when executing the second computer executable instructions 312, the second virtual machine 304 is configured to receive the first encrypted data 108 from the first virtual machine 303 and encrypt the first encrypted data 108 so as to generate the second encrypted data 112. Data encryption may be provided as described above in FIG. 1 with respect to the encryption module 102. The second virtual machine 304 may then provide the second encrypted data 112 to the RF transceiver 104, which modulates the second encrypted data 112 onto the RF signal 114 as described above with respect to FIG. 1. The user interface 116 may be provided so as to select and deselect the encryption module 302 and to select a modulation scheme for the RF transceiver 104, also as described above with respect to FIG. 1.

In one embodiment, the first virtual machine 303 is a virtual router while the second virtual machine 304 is a virtual firewall. As shown in FIG. 3, the encryption module 302, the RF transceiver 104, and the user interface 116 are provided in the housing 118.

Those skilled in the art will recognize improvements and modification to the preferred embodiments of the present disclosure. All such improvements and modifications are considered within the scope of the concepts disclosed herein and the claims that follow.

What is claimed is:

1. A data transmission network device, comprising:
an encryption module comprising
a first processing circuit configured to receive the first data and encrypt the first data so as to generate first encrypted data;
a second processing circuit configured to receive the first encrypted data from the first processing circuit; and encrypt the first encrypted data so as to generate the second encrypted data, wherein the encryption module is configured to:
receive first data;
encrypt the first data so as to generate first encrypted data;
encrypt the first encrypted data so as to generate second encrypted data; and
a radio frequency (RF) transceiver configured to generate an RF signal such that the second encrypted data is modulated onto the RF signal, to encrypt the RF signal, and to encrypt the RF signal using an encryption technique selected from a group consisting of frequency hopping, dynamic symbol rate adjustments, and power to signal ratios that mask the RF signal within the noise floor;
a first printed circuit board and a second printed circuit board, wherein:
the first processing circuit is integrated into the first printed circuit board; and
the second processing circuit is integrated into the second printed circuit board.

2. The data transmission network device of claim 1, further comprising a bus operably interfacing the first printed circuit board and the second printed circuit board.

3. The data transmission network device of claim 1, wherein:
the first processing circuit comprises:
one or more first processors;
one or more first memories configured to store first computer executable instructions, wherein, when executing the first computer executable instructions, the one or more first processors are configured to:
receive the first data;
encrypt the first data so as to generate first encrypted data;
the second processing circuit comprises:
one or more second processors;
one or more second memories configured to store second computer executable instructions, wherein, when executing the second computer executable instructions, the one or more second processors are configured to:
receive the first encrypted data from the first processing circuit; and
encrypt the first encrypted data so as to generate the second encrypted data.

4. The data transmission network device of claim 1, further comprising a housing, wherein the encryption module and the RF transceiver are both provided in the housing.

5. The data transmission network device of claim 1, further comprising a housing, wherein the encryption module and the RF transceiver are both provided in the housing.

6. The data transmission network device of claim 1, wherein the encryption module is configured to:
implement a first virtual machine, wherein the first virtual machine is configured to:
receive the first data;
encrypt the first data so as to generate first encrypted data;
implement a second virtual machine, wherein the second virtual machine is configured to:
receive the first encrypted data from the first virtual machine; and
encrypt the first encrypted data so as to generate the second encrypted data.

7. The data transmission network device of claim 6, wherein the encryption module comprises:
one or more processors; and
one or more memories configured to store computer executable instructions, wherein, when the one or more processors execute the computer executable instructions, the one or more processors are configured to implement the first virtual machine and the second virtual machine.

8. The data transmission network device of claim 7, wherein:
the first virtual machine comprises a virtual router; and
the second virtual machine comprises a virtual firewall.

9. The data transmission network device of claim 7, further comprising a housing, wherein the encryption module and the RF transceiver are both provided in the housing.

10. The data transmission network device of claim 6, wherein:
the first virtual machine comprises a virtual router; and
the second virtual machine comprises a virtual firewall.

11. The data transmission network device of claim 1, wherein the RF transceiver is operable to modulate the second encrypted data onto the RF signal in accordance with multiple selectable modulation schemes.

12. The data transmission network device of claim 1, wherein the encryption module is configured to be disabled such that the first data is modulated onto the RF signal without encryption.

13. The data transmission network device of claim 1, wherein the encryption module is configured to encrypt the first data so as to generate the second encrypted data using a pre-placed public key (PPPK).

* * * * *